United States Patent [19]
Reyne

[11] Patent Number: 4,887,384
[45] Date of Patent: Dec. 19, 1989

[54] CONTROLLED WICK-TYPE HERBICIDE APPLICATOR

[76] Inventor: Darwin O. Reyne, R.R. 1, Box 51, Rushmore, Minn. 56168

[21] Appl. No.: 186,027

[22] Filed: Apr. 25, 1988

[51] Int. Cl.⁴ .............................................. A01G 13/00
[52] U.S. Cl. .......................................... 47/1.5; 47/1.7
[58] Field of Search ........................... 47/1.43, 1.5, 1.7

[56] References Cited

U.S. PATENT DOCUMENTS

| | | | |
|---|---|---|---|
| 1,527,669 | 2/1925 | Camp | 47/1.5 |
| 1,568,448 | 1/1926 | Freeman | 47/1.5 |
| 1,643,846 | 9/1927 | Hale | 47/1.7 X |
| 1,764,952 | 6/1930 | Hay | 47/1.7 X |
| 4,054,007 | 10/1977 | Moore | 47/1.7 |
| 4,206,569 | 6/1980 | Randolph | 47/1.7 |
| 4,211,175 | 7/1980 | Van der Lely | 47/1.7 X |
| 4,426,807 | 1/1984 | Maddock | 47/1.5 |
| 4,443,970 | 4/1984 | Randolph | 47/1.5 |
| 4,459,777 | 7/1984 | Moore et al. | 47/1.5 |
| 4,567,689 | 2/1986 | Lemons | 47/1.7 |
| 4,677,787 | 7/1987 | Said | 47/1.5 |

FOREIGN PATENT DOCUMENTS

| | | | |
|---|---|---|---|
| 2428395 | 1/1980 | France | 47/1.5 |
| 255883 | 7/1948 | Sweden | 47/1.7 |

*Primary Examiner*—Robert A. Hafer
*Assistant Examiner*—Kevin G. Rooney

[57] ABSTRACT

For applying herbicides in fields of row crops an applicator in which the herbicide can be selectively applied to a localized wick in the row in which the weeds are present. The wick is also selectively supplied with herbicide dependent on whether or not weeds are present.

2 Claims, 2 Drawing Sheets

CONTROLLED WICK-TYPE HERBICIDE APPLICATOR

BACKGROUND AND SUMMARY OF THE INVENTION

This invention pertains to applicators for herbicides to be used in killing weeds in row crops and more particularly to a wick-type applicator in which the wick is localized and the application of herbicide to the wicks is selective both in time and location.

Weed control in row crops has always been a problem. Weeds use up both soil nutrients and moisture which could better be used by the planted crop. Therefore, control of weeds has been an unending problem.

Early farmers and gardeners usually used physical methods of removing weeds. Hand pulling or hoeing of weeds are the gardeners methods. Cultivators—in reality, powered hoes—were the early farming methods. The cultivator did two things. It disturbed the earth between the rows, thereby uprooting plants in that area; and it moved dirt from between the rows to within the row to cover plants lower than the crop within the row. Moving the earth and cutting into it require considerable power, however, and are not in the least selective so that frequently a lot of power was expended needlessly.

Recently, chemical means of weed control have become more common. Herbicide chemicals adapted to kill selected types of plants have been developed and are widely used. Some kinds of these chemicals may be injected into the soil at planting time or later and are effective in keeping weeds down. Other kinds of weed sprays may be applied after planting.

Various applicators are used for the kind of chemicals which kill the weed because of contact between the chemical and the plants. Aerial spraying is sometimes used, but is often avoided because of the drifting of the material into neighboring fields which may be planted to crops which might be damaged by the herbicide used. Spraying by use of a sprayer mounted on a farm tractor or pulled by one is also used.

A more recent development is the use of a wick-type applicator in which a wick in the form of a cable stretched along a bar is pulled through a field. The wick is saturated with a liquid herbicide of the desired type which may be specific as to the types of plants to be destroyed. As the wick is then pulled through the field, any plant brushed by the wick will be subject to the action of the herbicide. This method works well, particularly in fields where the weeds to be destroyed are taller than the crop to be preserved so that the wick will brush against the taller weeds.

There are some drawbacks to the wick device, however. The principal drawback is economic. The current wick-type applicators require the whole wick to be saturated all the time. Since herbicides are relatively expensive, this results in excessive cost when there are commonly only certain individual plants or small areas of plants to be sprayed.

That drawback is emphasized by the recent development of the "bean-buggy" type of device in which individuals ride on a tractor-carried or tractor-pulled device. Each individual carries a small sprayer or a nozzle from a larger sprayer with which he or she can apply the spray directly to the weeds in the row or adjacent rows over which the operator is being carried. This system too, becomes expensive if the individual operators are paid wages.

Another advantage of my device resides in the fact of a reduced use of herbicides. By using wicks and herbicide to control only weeds within the plant rows and using physical uprooting of weeds between the rows, I provide complete control of the weeds using a minimum amount of herbicide. Thus, contamination of the soil by the heribicide is kept to an absolute minimum while getting full control of the weeds.

By my invention, I provide a wick-type applicator for a herbicide in which the tractor operator can selectively apply herbicide to individual wicks over the crop rows and the herbicide is used only when weeds are present. This system substantially reduces the amount of herbicide used and therefore the cost to the farmer.

FIGURES

DESCRIPTION

Figure 1:
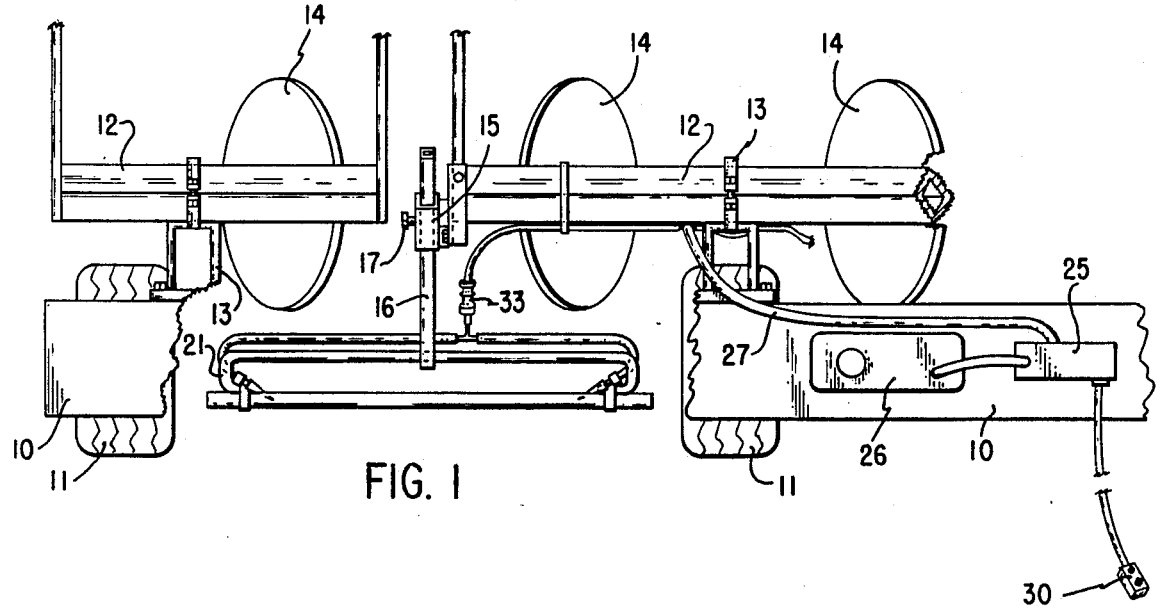
FIG. 1 is a top plan view of my device mounted on a cultivator.
Figure 2:
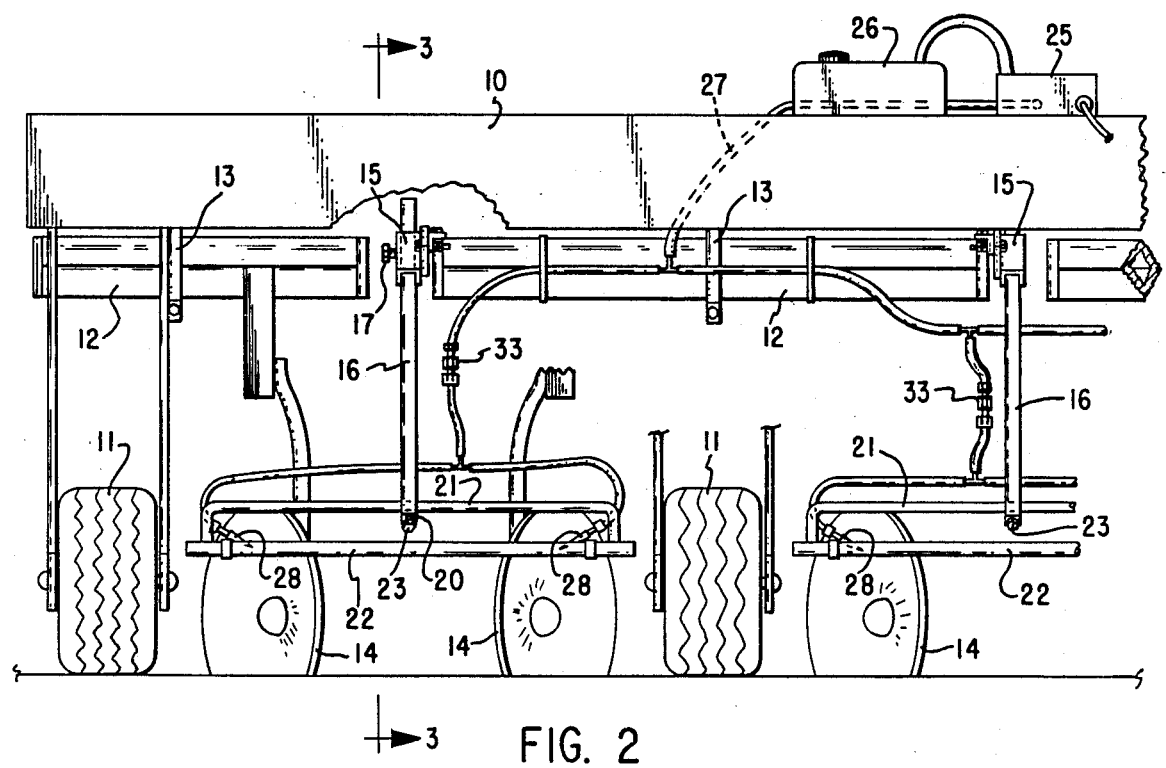
FIG. 2 is a front elevational view of the machine as shown in FIG. 1.
Figure 3:
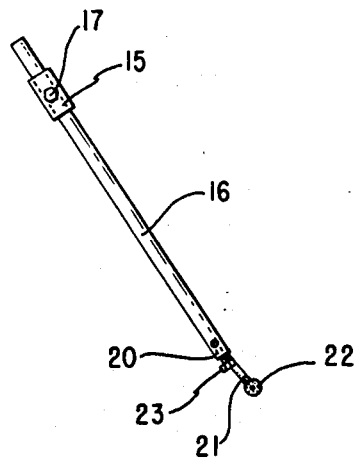
FIG. 3 is a detailed view from line 3—3 of FIG. 1.

Briefly my invention comprises a segmented wick-type applicator for herbicide. The wick is mounted in segments on a cultivator and has a supply of herbicide which can be injected into each wick in response to a stimulus from the operator of the tractor.

More specifically and referring to the figures, my device is adapted to be mounted on a farm cultivator. I have illustrated one particular type of cultivator, but it will be readily understood that the device can be adapted to other types of cultivators. The illustrated cultivator is mounted on a tool bar 10 which may be carried by wheels 11 mounted on the bar 10. Auxiliary bars 12 mounted on the tool bar 10 by means of brackets 13 serve as carrier of the colter 14 which move the earth being cultivated. Thus, the tool bar 10, brackets 13 and auxiliary bar 12 form a frame for the cultivator. The wheels 11 run between the rows and over the area into which the colter 14 through the dirt in this system of cultivating. Although I have illustrated a particular type of cultivator, it will be readily apparent that my device is usable with other types such as the cultivator using conventional cultivator shovels.

Each individual wick device is mounted from the bar 12 on a bracket 15. The bracket 15 is formed to provide an opening through which a support bar 16 is adapted to slide, thus allowing adjustment of the length of the extension of that bar. A set screw 17 may be used to hold the support in its adjusted position. I have illustrated, and prefer to use a piece of square tubing for the support bar 16 and thus to form the bracket 15 with a square opening to receive such tubing. However, it will be evident that other shapes or kinds of material could be used. A bracket and the assembly it carries is provided in position to be carried over each crop row the cultivator is designed to treat.

At its lower end (the one away from the bracket 15), each bar 16 carries a socket member 20 adapted to encircle the transverse carrier yoke 21 which supports the wick 22. This yoke can be rotatably adjusted in the member 20. The carrier is bent at the ends to carry the wick 22 in a position somewhat offset from the main part of the yoke. Thus a rotating adjustment provides a fine tuning adjustment of the height of the wick. By sliding the yoke 21 laterally in the socket member 20, some lateral adjustment may also be acheived. A set screw 23 may also be used to clamp the yoke 21 in its proper adjusted position.

A system is also provided to supply the liquid herbicide to the various wicks 22 along the width of the cultivator. This system includes a pump 25 which may be either hydraulically or electrically driven. Because of the need for ease of control in my preferred embodiment, I prefer the electrical pump. The pump is designed to provide liquid from a tank 26 through a system of tubes 27 to needle-like injectors 28 at each end of each wick. A control switch 30 for the pump 25 to turn it off and on may be located in the cab of the tractor (not shown) within reach of the operator of the device. By turning on the pump, the operator can thus direct the liquid and inject it into the wicks. Thus the herbicide can be withheld when there are no weeds present.

For cultivators for four or six rows, a finer control will probably not be needed. For the wider machines, I envision use of two systems of the type described. However, I also conceive of even finer control by which each row could have an individual control. In such a system, the pump would be run constantly and individual valves would be placed in each line as at 33. These valves would be electrically operated having individual controls in the tractor cab. Because of the complexity of such system, I prefer controlling the pump to supply a plurality of wicks 22 although the number of wicks on each pump must be reasonably small in order to obtain the greatest savings from limited use of the herbicide.

The use of the device is apparent from the foregoing description. As the cultivator passes over the field, the operator watches for individual large weeds or clumps of weeds. When a weed or weeds are spotted, the operator, as he approaches that area will actuate the pump 25, thus providing herbicide to the wick 22 on the particular row or rows where the weeds are located. As the wick passes over the weeds, brushing the herbicide onto the plant, the operator can turn off the pump and leave it dormant until more weeds are located. Thus, herbicide is selectively applied, and considerable savings are realized because of a great reduction in evaporation and dripping from the usual long wick.

I claim as my invention:

1. In combination with a row-crop field cultivator having a frame including at least two bars, earth engaging weed control means mounted on one of said bars adapted to physically control weeds between rows of a crop; herbicide applicator means comprising separate wick means adjustably mounted on the other of said bars, whereby the height of said wick means above the crop may be precisely and individually adjusted, each wick means including a support slidably mounted relative to said other bar, a rope-like wick attached at its ends to said support, each of said wick means being adapted to be carried above a single row of crop, and supply means connected to said wick means to supply liquid herbicide to said wick means, said supply means including hollowed needles having sharpened points inserted into the interior near each end of said wick.

2. The combination of claim 1 in which said supply means includes a pump adapted to be controlled by an operator, said pump being connected to said wick means by separate tube means leading to each wick means.

* * * * *